Dec. 15, 1942.    R. W. GOFF    2,305,415
ELECTROMAGNET
Filed May 24, 1941
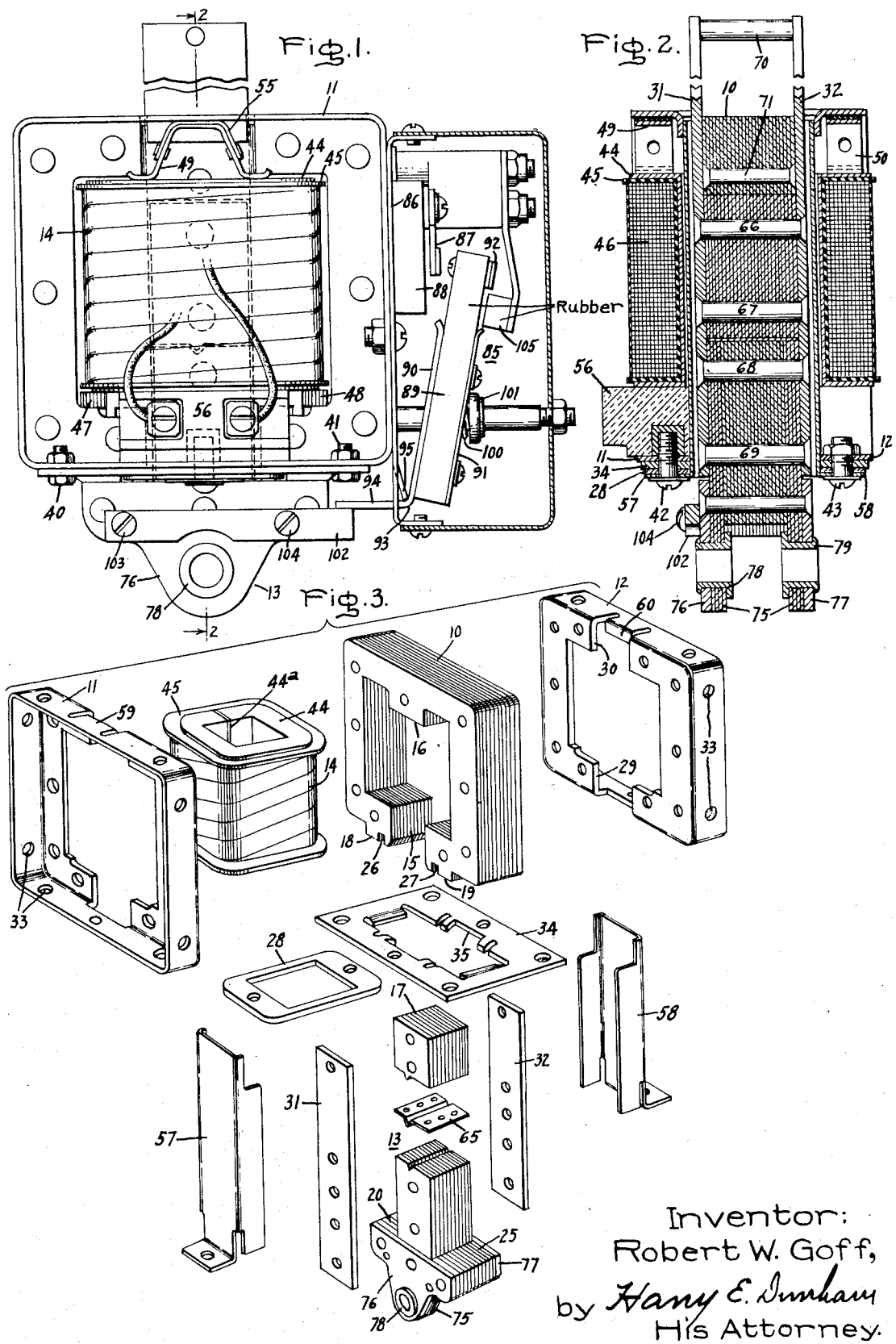
Inventor:
Robert W. Goff,
by Harry E. Dunham
His Attorney.

Patented Dec. 15, 1942

2,305,415

UNITED STATES PATENT OFFICE 2,305,415

ELECTROMAGNET

Robert W. Goff, Schenectady, N. Y., assignor to General Electric Company, a corporation of New York Application May 24, 1941, Serial No. 395,077

4 Claims. (Cl. 175—338)

My invention relates to plunger type electromagnets suitable for energization either by alternating current or direct current and of general application for the operation of switches, valves and like devices.

One of the principal objects of my invention is to provide an improved device of the above character having greatly increased mechanical life and electrical and mechanical efficiency and comprising a small number of inexpensive and easily assembled parts.

Another object of my invention is to provide means for preventing sticking of the plunger due to residual magnetism, while also lengthening the mechanical life of the device by minimizing seating pressures and equalizing stress on the various parts.

It is a further object of the invention to provide improved means for mounting the energizing coil in connection with readily accessible terminal connections for the coil.

To the attainment of the foregoing and other objects and advantages my invention is preferably embodied in the detailed construction to be hereinafter more fully described and claimed and is illustrated in the accompanying drawing in which Fig. 1 is a side elevation of an electromagnet embodying my invention and having attached thereto a cutout switch suitable for use in connection with direct current operation of the magnet, the cutout switch cover being shown in section; Fig. 2 is a sectional view taken along the line 2—2 of Fig. 1 looking in the direction of the arrows and showing in detail the assembled relation of the various parts of the device; and Fig. 3 is an exploded perspective view showing structural details of the principal parts of my electromagnet.

Referring now to the drawing, the electromagnet comprises essentially a magnetic frame comprising a laminated core structure 10 and a pair of end plates 11 and 12, a movable magnetic plunger 13, and an energizing coil 14. To provide for efficient operation on alternating current the core 10 and the plunger 13 are each built up of a multiplicity of relatively thin laminations of magnetic material. As clearly indicated at Fig. 3, the core laminations are generally rectangular in shape and are provided with an aperture 15 in the lower side thereof for the reception of the movable plunger 13. The upper side of the rectangular laminations is provided with an inwardly extending polar projection 16 opposite the aperture 15 for cooperation with a pole face 17 of the T-shaped plunger 13. Adjacent each side of the aperture 15 the core laminations are provided with a pair of polar projections 18 and 19 for engagement respectively with a pair of pole faces 20 and 25 of the movable plunger. The polar projections 18 and 19 define a pair of pole faces lying in the same plane and are provided with transverse slots 26 and 27 respectively to accommodate a shading coil 28.

The core laminations are clamped in alignment by rivets or other suitable fastening means between a pair of flanged end plates 11 and 12 of magnetic material. The end plates 11 and 12 are of rectangular shape to follow the general contour of the laminated core and are provided on each of their four sides with a flange suitable for mounting the electromagnet to a support or for mounting auxiliary apparatus to the electromagnet. Each of the end plates 11 and 12 is apertured at 29 and 30 to accommodate one of a pair of guide strips 31 and 32 which serve to protect and hold in assembled relation the various parts of the movable plunger 13. Preferably, the end plates 11 and 12 are pressed into the form shown and each of their flanges is provided with a plurality of bolt holes 33 to provide for convenient mounting of other apparatus. If desired box-like covers may easily be mounted upon the flanged end plates 11 and 12 to enclose the magnetizing coil 14.

In order to reinforce the core laminations in the region of the polar projections 18 and 19 a tie plate 34 having a complementally shaped aperture 35 is pressed over the projecting polar ends 18 and 19 of the core laminations. The tie plate 34 lies parallel to the lower flanges of the end plates 11 and 12 and is connected thereto by bolts 40 and 41 of Fig. 1 and bolts 42 and 43 of Fig. 2. The plate thus acts as a tension member to bind together the side frames 11 and 12 and the individual laminations forming the polar projections 18 and 19. Since the polar projections 18 and 19 are particularly subject to wear as a result of their constant contact with the pole faces 20 and 25 of the movable plunger 13, it will be evident that the tie plate 34 plays an important role in increasing the mechanical life of my electromagnet by tying together the laminations of the polar projections and preventing their flaring and breaking off under the impact stresses imparted to them by the head of the movable plunger. Since the tie plate 34 completely encircles the magnetic circuit, it links no resultant magnetic flux and therefore does not cause any energy loss.

To diminish vibration of the plunger 13 when the electromagnet is operated on alternating current, the shading coil 28, comprising a closed loop of electrically conducting material, is embedded in the slots 26 and 27 of the polar projections 18 and 19, respectively, and is bolted to the lower flanges of the end plates 11 and 12 by means of the bolts 42 and 43, as is clearly shown at Fig. 2. With this construction the shading coil 28 is easily replaceable in case of necessity.

The energizing coil 14 comprises an inner metallic spool body 44 of rectangular cross sectional configuration to accommodate the sectionally rectangular shank of the movable plunger 13. To prevent circulating currents in the spool body 44 it is slotted axially at 44a as shown at Fig. 3. An outer spool body 45 of suitable insulating material surrounds the metallic body 44 and acts as a liner between the spool 44 and the conducting winding 46 of the coil. The maximum height of the coil 14 is slightly less than the distance between the polar projection 16 and the opposing inner face of the laminated core 10. In mounting the coil within the rectangular frame 10 the coil is first slipped beneath the polar projection 16 and is then raised so that the projection 16 extends within the rectangular central aperture of metallic spool body 44. To support the coil 14 in this position, the lower collar of the coil may rest upon a pair of coil spacers 47 and 48 (Fig. 1) which extend between and are supported upon the lower edges of the end plates 11 and 12 on opposite sides of the central plunger receiving aperture 15 of the core. The coil spacers 47 and 48 are preferably formed of a suitable insulating material.

In order to maintain the energizing coil 14 firmly in position, a pair of U-shaped spring strips 49 and 50 are inserted between the upper coil collar and the upper flanges of the end plates 11 and 12. To preclude the flow of undesirable eddy currents each of the spring strips 49 and 50 has riveted thereto a strip 55 of insulating material in such a position as to insulate the spring strips from the frame end plates 11 and 12.

To provide for convenient connection to the magnetizing coil 14 a terminal block 56, preferably formed of suitable molded insulating material, is inserted on one side of the electromagnet between the lower flange of the end plate 11 and the lower collar of the energizing coil. Preferably, the vertical dimension of the terminal block 56 is such that it fits snugly between the flange and the collar but does not lend any appreciable support to the energizing coil. The terminal block 56 is bolted to the end plate 11 by means of the bolt 42 as is clearly shown at Fig. 2.

The frame structure is completed by a pair of channel shaped guide plates 57 and 58 mounted in opposing relationship within the spool body 44 to define a central rectangular plunger-receiving passageway within the coil 14 and to assist in positioning the coil within the frame. The guide plates 57 and 58 are flanged at their lower ends and are bolted to the end plates 11 and 12 by means of the bolts 42 and 43 respectively as shown at Fig. 2. In order to position the upper ends of the guide plates 57 and 58 the upper horizontal flanges of the end plates 11 and 12 are slotted and bent downwardly to form shoulders 59 and 60 respectively spaced outwardly from the core laminations 10. Since the guide plates 57 and 58 are subject to considerable abuse because of their repeated sliding engagement with the sides of the movable plunger 13, it is essential that these guide plates be formed of a material sufficiently hard to withstand such rugged treatment for a considerable period of time without appreciable wear. I have found by experiment that tempered beryllium bronze is a material excellently suited to this use and will provide a frame structure not subject to the objectionable wear which has heretofore caused undesirably loose fits between frame and plunger. It will, therefore, be evident that the tempered beryllium bronze guide plates 57 and 58 are essential in contributing to the improved durability of my electromagnet.

The movable plunger 13 comprises a head portion and a shank portion built up of a multiplicity of thin laminations of magnetic material to define the three pole faces 17, 20 and 25. The shank portion of the plunger is of rectangular cross section and of such dimensions as to provide slight clearance within the rectangular tube defined by the guide plates 57 and 58.

In order to provide a section of permanently high and constant reluctance regardless of the amount of wear upon the pole faces of the plunger, the shank portion of the plunger is divided into two sections in a plane at substantially right angles to the axis of the shank portion to accommodate a non-magnetic shim 65. The shim 65 is preferably formed of a non-magnetic high resistance stainless steel and is provided with a plurality of perforations to increase its resistance and thereby cut down eddy current loss within the shim. The shim is held in place by a V-shaped transverse bend across its center which cooperates with a complementally shaped groove and projection on adjacent surfaces of the shank section laminations.

The divided shank portion of the plunger is held together and the shank laminations are clamped in alignment between the plunger guide strips 31 and 32. To provide a smooth external surface for the plunger, the guide strips 31 and 32 are preferably connected by means of flat headed rivets 66, 67, 68 and 69 as best shown at Fig. 2. Magnetic shunting of the shim 65 is prevented by using a non-magnetic high resistance stainless steel for the guide strips 31 and 32. Such a ferrous alloy is softer than the guide plates 57 and 58 thereby to minimize wear on the guide plates. As shown in the drawing the guide strips 31 and 32 extend beyond the pole face 17 of the plunger through slots formed between the guide plates 57 and 58 and the side surfaces of the laminated core 10 in the region of the polar projection 16. The extending ends of the guide strips 31 and 32 are connected in parallel spaced relation by a spacing bolt 70. It will be evident that in order to accommodate the extending ends of the guide strips 31 and 32 the width of the laminated core in the region of the polar projection 16 must be slightly less than the distance between the inner surfaces of the guide strips 31 and 32. As shown in Fig. 2 the central rivet 71 which clamps the core laminations in the region of the polar projection 16 is provided with flat heads to avoid interference with the extending ends of the guide strips 31 and 32. The extending guide strips 31 and 32 and the spacing bolt 70 may be used for connection of the movable plunger to a load in pushing relation. I wish to have it understood, however, that this construction has been illustrated by way of example only and that if desired the guide strips 31 and 32 may be made of the same length as the shank portion of the movable plunger.

Provision is made for the connection of the movable plunger to a load in pulling relation by forming the outside laminations of the plunger head with depending V-shaped portions 75. The laminations of the plunger head are then clamped in alignment between a pair of end plates 76 and 77 shaped to correspond to the shape of the head end portion of the plunger laminations.

The depending V-shaped portions of the plunger head are bored and carry steel bushings 78 and 79. Preferably the manufacturing tolerances are such that the bushings must be pressed into the plunger head bores. After pressing the bushings in place they are swaged and machined to give accurate inside and outside dimensions which could not otherwise be obtained. The bushings 78 and 79 also serve to clamp the depending laminations of the plunger head in alignment and add rigidity to the head.

The bushings 78 and 79 serve primarily to prevent the development of lost motion between the movable plunger and a connected load as has heretofore occurred as a result of flared and worn irregular lamination ends in an unlined plunger bore. It has been found that when plunger laminations are punched the punching operation leaves the ends of adjacent laminations very irregular and therefore particularly subject to wear. It has also been found unsatisfactory to subsequently ream the punched holes because of the fact that objectionable rusting of the laminations results from removal of their original finished surface.

According to my invention the length of the shank portion of the movable plunger 13 between the plane of the pole faces 20 and 25 and the plane of the pole face 17 is substantially equal to the vertical distance between the plane of the pole faces defined by the polar projections 18 and 19 and the plane of the pole face defined by the polar projection 16, so that when the plunger 13 is in its picked-up position no air gap exists between the core and plunger at any of their points of contact. It will be understood that the magnetic flux path passes between the shank portion of the plunger 13 and the polar projection 16, and then divides to pass through the side legs of the core, the polar projections 18 and 19, the plunger head and back to the plunger shank. With my construction the plunger engages the core at all points of transfer of the flux path between the core and plunger. Preferably, the shank portion of the plunger is originally machined to fall just slightly short of this dimension so that when the electromagnet is first assembled only the pole faces 20 and 25 engage the core, while a small air gap is left at the pole face 17. The air gap at the pole face 17 is made sufficiently small so that after relatively little wear at the pole faces 20 and 25 the plunger will seat firmly against the core at all three surfaces. By providing my magnet with three striking surfaces I have substantially increased the mechanical life of the magnet since the load is distributed more evenly over all the rivets in the frame and plunger. It is to compensate for this total absence of air gap in my electromagnet that I have provided the high reluctance shim 65 in the shank portion of the plunger. This construction provides a section of the magnetic flux path with a permanently high reluctance and prevents a gradual loss of initial air gap which has heretofore caused electromagnets to be held in by residual magnetism after a certain amount of wear has taken place.

While the construction and arrangement of the magnetic circuits and the magnetizing and pole shading windings of the electromagnet described heretofore are particularly advantageous and efficient when the electromagnet is energized with alternating current, still the identical construction and arrangement may be used in direct current service with materially increased power and efficiency of the electromagnet. In direct current service it is customary to provide a cutout switch 85 which ordinarily has normally closed contacts and is arranged to alter the magnetizing coil connections after attraction of the plunger, thereby to decrease the energization of the magnet for holding purposes. By way of illustration, I have shown in Fig. 1 a cutout switch of preferred form. In Fig. 1 the electromagnet is shown in its attracted position in order to show the switch in its contact opening position. Preferably, the switch 85 comprises a base plate 86 carrying a pair of fixed contacts 87 mounted upon a support 88, and a rubber or other resilient switch operating member 89 mounted between and extending beyond a pair of rigid supporting plates 90 and 91 and carrying at its free end a movable bridging contact 92. The supporting plate 90 is bent transversely to form a pivot seat 93 and a striker member 94. The switch base plate 86 is slotted and bent to form a knife edge 95 for cooperation with the pivot seat 93. A spring 100 is arranged to engage a fixed stop 101 to bias the movable switch member 89 to a contact closing position. The cutout switch is operated directly by the movable plunger 13 by means of an operating bar 102 connected to the plunger head by bolts 103 and 104 and arranged to engage the striker portion 94 of the supporting plate 90, thereby to open the switch upon actuation of the plunger. As is more fully described and claimed in my copending application Serial No. 386,928, filed April 4, 1941, and assigned to the same assignee as the present application, the switch 85 is also provided with a rubber buffer member 105 positioned adjacent the actuated position of the contact carrying member 89, thereby to damp oscillations of the free end of the resilient member 89.

While I have illustrated and described the improvements of the present invention in a preferred form of an electromagnet, it will be understood that various changes and modifications therein may be made by those skilled in the art without departing from the spirit and scope of my invention. For example, while I have shown a magnet frame of generally rectangular configuration, it will be evident that my improvements may equally advantageously be incorporated into a magnet having a frame of any desired shape which includes upper, lower and side members, and the term "rectangular" is intended to include such shapes. It will therefore be understood that the claims appended hereto are intended to cover all changes and modifications which fall within the true spirit and scope of my invention.

What I claim as new and desire to secure by Letters Patent of the United States is:

1. An electromagnet comprising a magnetizing winding, a substantially rectangular laminated core structure formed to provide a plunger receiving aperture in one side thereof and a pair of polar projections on opposite sides of said aperture, said polar projections defining a first pair of pole faces lying in the same plane, said plane being substantially perpendicular to the laminations of said core structure, a movable magnetic plunger mounted within said aperture and having a head portion provided with a second pair of pole faces strikingly engageable with said first pair of pole faces, a substantially flat tie plate having a central aperture complementally shaped to embrace both said polar projections and to include no resultant magnetic flux, said tie plate clamping all sides of said first pole faces tightly within said central aperture and being positioned to lie in a plane parallel to the plane of said first pole faces and closely adjacent thereto thereby laterally to buttress the pole face laminations of said core structure against flaring and breakage under the repeated impact of said head portion of said plunger, means for connecting said plate to said core structure, and a single shading coil embracing a portion of the area of each of said pole faces.

2. An electromagnet comprising a magnetizing winding, a substantially rectangular laminated core structure having a plunger receiving aperture in one side thereof, a pair of substantially rectangular end plates connected together to clamp said laminated core in alignment, the laminations of said core structure adjacent said plunger receiving aperture being shaped to provide a first pair of pole faces extending beyond said end plates and lying in a single plane, said plane being substantially perpendicular to said laminations, a flange on each of said end plates arranged to lie in a plane substantially parallel to the plane of said first pole faces, a T-shaped magnetic plunger having a shank portion slidable within said aperture and a head portion defining a second pair of pole faces strikingly engageable with said first pole faces, a substantially flat tie plate having a central aperture arranged to embrace both said polar projections and the total flux of both of said pole faces and positioned to lie in a plane parallel to said flanges, said tie plate clamping all sides of said first pole faces tightly within said central aperture and being positioned against said flanges and closely adjacent the plane of said first pole faces thereby laterally to buttress the pole face laminations of said core structure against flaring and breakage under the repeated impact of said head portion of said plunger, means for detachably connecting said tie plate to said flanges, and a single shading coil embracing a portion of the area of each of said pole faces.

3. An electromagnet comprising a substantially rectangular laminated core structure apertured at one side and provided on its opposite side with a polar projection extending toward said aperture, a pair of polar projections formed upon and extending beyond the external periphery of said core structure adjacent said aperture to define a first pair of pole faces lying in a single plane, a T-shaped movable magnetic plunger comprising a shank portion slidably mounted within said aperture and engageable with said first polar projection and a head portion defining a second pair of pole faces strikingly engageable with said first pole faces, an energizing winding positioned within said rectangular core structure to encircle said first polar projection and said shank portion of said plunger, a substantially flat tie plate having a central complementally shaped aperture for embracing said pair of polar projections thereby to embrace no resultant magnetic flux, said tie plate clamping all sides of said first polar projections tightly within said central aperture and being positioned to lie in a plane parallel to said single plane and closely adjacent thereto thereby laterally to buttress the pole face laminations of said core structure against flaring and breakage under the repeated impact of said head portion of said plunger, means for detachably connecting said tie plate to said laminated core structure, and an annular shading coil separate from said tie plate and embracing a portion of the magnetic flux of each of said pole faces.

4. An electromagnet comprising a rectangular laminated core structure having a plunger receiving aperture in one side thereof and an inwardly extending polar projection opposite said aperture, a pair of rectangular end plates provided with flanges and connected together to clamp said laminated core in alignment, a pair of polar projections extending outwardly from said laminated core on opposite sides of said aperture and beyond the flanges of said end plates to define a first pair of pole faces lying in a single plane parallel to and adjacent said flanges, said plane being substantially perpendicular to the laminations of said core structure, a T-shaped movable magnetic plunger having a shank portion slidably mounted within said aperture and engageable with said first polar projection and a head portion defining a second pair of pole faces strikingly engageable with said first pair of pole faces, each of said pair of polar projections being provided with a transverse slot, a substantially flat tie plate having a central complementally shaped aperture and arranged to lie in a plane substantially parallel to and closely adjacent the plane of said first pole faces to embrace said pair of polar projections thereby to include within said central aperture no resultant magnetic flux, said tie plate clamping the sides of said pair of polar projections tightly within said central aperture thereby laterally to buttress the pole face laminations of said core structure against flaring and breakage under the repeated impact of said head portion of said plunger, a single shading coil having opposite sides thereof positioned within said slots, means for detachably connecting said shading coil and said tie plate to said flanges, and an energizing winding for said magnet positioned within said rectangular core structure to encircle said first polar projection and said shank portion of said plunger.

ROBERT W. GOFF.